(12) United States Patent
Page et al.

(10) Patent No.: US 7,631,486 B2
(45) Date of Patent: Dec. 15, 2009

(54) THRUST ORIENTING NOZZLE

(75) Inventors: Alain Page, Montgeron (FR); Jackie Prouteau, Villecresnes (FR); Thomas Daris, Paris (FR); Marc Doussinault, Le Mee S/Seine (FR); Frederic Schenher, La Chapelle Gauthier (FR)

(73) Assignee: SNECMA, Paris (FR)

( * ) Notice: Subject to any disclaimer, the term of this patent is extended or adjusted under 35 U.S.C. 154(b) by 572 days.

(21) Appl. No.: 11/427,523

(22) Filed: Jun. 29, 2006

(65) Prior Publication Data

US 2007/0000233 A1 Jan. 4, 2007

(30) Foreign Application Priority Data

Jun. 30, 2005 (FR) .................................. 05 51857

(51) Int. Cl.
*F02K 1/28* (2006.01)
(52) U.S. Cl. ........................ 60/229; 60/231; 239/265.23
(58) Field of Classification Search .................... 60/228, 60/229, 231, 269, 770; 239/265.17, 265.23, 239/265.25
See application file for complete search history.

(56) References Cited

U.S. PATENT DOCUMENTS

| 3,285,262 | A | * | 11/1966 | Ernst et al. ..................... 60/229 |
| 5,170,964 | A | | 12/1992 | Enderle et al. |
| 5,706,650 | A | | 1/1998 | Thayer |
| 6,112,513 | A | | 9/2000 | Catt et al. |
| 6,679,048 | B1 | | 1/2004 | Lee et al. |
| 2002/0189232 | A1 | | 12/2002 | Weiland et al. |

FOREIGN PATENT DOCUMENTS

EP 1 158 156 A2 11/2001

\* cited by examiner

*Primary Examiner*—Louis J Casaregola
(74) *Attorney, Agent, or Firm*—Oblon, Spivak, McClelland, Maier & Neustadt, L.L.P.

(57) ABSTRACT

The present invention relates to a thrust orienting nozzle, shaped in such a way as to divide a principal propulsion gas flow coming from at least one gas generator into a first flow and a second flow for an ejection in a first half-nozzle and in a second half-nozzle and comprising at least one of following two piloting means: a means of dividing the principal flow into each of the two half-nozzles, and a means of orienting the thrust vector produced by each of the two half-nozzles.

Figure 1:
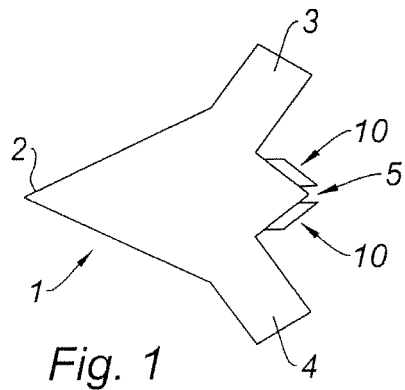

The invention applies in particular to the yaw control of an aircraft without a vertical tail unit.

14 Claims, 2 Drawing Sheets

THRUST ORIENTING NOZZLE

BACKGROUND OF THE INVENTION

1. Field of the Invention

The invention relates to the field of the propulsion of aircraft by ejection of a gas flow, and relates to a thrust orienting nozzle.

2. Description of Related Art

For aircraft propelled by turbojets, with or without a pilot and for drones, having military applications, one objective is stealth.

Stealth is defined in particular in relation to two parameters: the Radar Cross-Section (RCS) and the Infra-Red Signature (IRS). The RCS is the cross-section likely to appear on a radar, taking account of the geometry of the aircraft. The IRS is the heat signature which the aircraft leaves, in particular from its ejection nozzles.

In order to reduce the RCS, it is preferable for the aircraft not to have any stabilizer or vertical tail unit at the rear of the fuselage. The problem of guiding the aircraft then arises, in particular with regard to its changes of direction. In this case it is proposed, in order to control the aircraft in yaw, to carry out a vectoring, that is to say acting on the orientation of the thrust vector.

To pilot the aircraft by acting on the orientation of the gas jet coming from the nozzle is already known. There are solutions which use mechanical or fluidic means for deflection or orientation of the jet. The control of the gas jet by fluidic injection in the divergent portion of the nozzle is an advantageous solution for the application envisaged above because it harmonizes vectoring and discretion aspects. Many studies have already been carried out on the subject.

In the context of the control of missiles in particular, the fluidic injection technique is already used in the divergent portion of the nozzle. The principle consists in creating an obstruction in the divergent portion of the nozzle by an injection of gas. The deflection of the thrust vector is then produced by the deflection of the flow on traversing the oblique shock wave induced by the obstruction and by the high pressure generated by the detachment of the boundary layer in the vicinity of the injection. This solution has the advantage of not having moving parts, unlike mechanical vector control nozzles. It does however suffer from the following disadvantages:

a large drawing off of engine air (of the order of 5%) is necessary in order to achieve thrust deflections of 15 to 20°;

non-negligible thrust losses are observed because of the engine drawing off and because of the losses when traversing the shock wave;

it has a risk of loss of deflection efficiency in the case of impact of the shock wave on the opposite wall.

According to another known technique, a deformation of the sonic line is carried out. The principle consists in obtaining the deflection of the thrust vector by modifying the shape of the sonic line at the throat of the nozzle. This modification is obtained by two simultaneous injections: at the throat on one wall and in the divergent portion of the opposite wall in a zone close to the throat section. This solution has the advantage of avoiding the formation of a shock wave inducing thrust losses. However, the injection at the geometric throat induces an aerodynamic modification of the throat and therefore has an effect on the output and performance of the engine. In particular, the compressor pumping margin is reduced. Moreover, the effectiveness of the device for controlling the yaw is still to be demonstrated.

Moreover, it is known to control the effective section of the throat of the nozzle by fluidic injection at the throat. The effectiveness of such a device has been proven experimentally and by calculation. It is thus possible to achieve effective cross-section restrictions of the order of 10% with an engine drawing-off of the order of 3%.

In the case of a nozzle such as intended to equip a military drone, an objective of IRS and RCS discretion is coupled with the vector thrust requirement. This leads to designing very flat two-dimensional nozzles, with an elongation of the order of 5 for the IRS and RCS discretions and having a pointed external shape for the RCS discretion. The techniques described above have proven their effectiveness with regard to deflection of the thrust vector in order to compensate for the lack of a vertical stabilizer. However, when they are put into practice for nozzles adapted for this application the following difficulties are observed:

Piloting by fluidic injections in a divergent portion requires a large application surface in order to be effective. This is the case for axisymmetric or two-dimensional nozzles with a slight elongation but not for the nozzles in the envisaged applications. Thus, in the configurations already tested, it appears that the lateral surfaces of the nozzles are rather short and of low height. This greatly limits the effectiveness of a parietal injection.

Injection in the vicinity of the nozzle throat gives rise to a substantial reduction in the flow coefficient by an effect of obstruction of the throat section. This reduction of the throat section has, as already reported above, a big effect on the functioning of the gas generator with, in particular, a reduction of the compressor pumping margin.

SUMMARY OF THE INVENTION

The subject of the present invention is therefore a device for piloting an aircraft, in particular in yaw, which does not exhibit the above disadvantages in particular, which is effective and which is associated with a control of the engine output.

This device is applicable to single-engine or twin-engine aircraft and in particular to drones.

This device is capable of continuously providing low amplitude vectoring without giving rise to any penalization of the gas generator performance.

It must be capable of providing a large vector thrust for the piloting requirements of the aircraft.

It must be capable of limiting the rear and crosswise IRS.

These objectives are achieved, according to the invention, with a thrust orienting nozzle, shaped in such a way as to divide a principal propulsion gas flow coming from at least one gas generator into a first flow and a second flow for an ejection in a first half-nozzle and in a second half-nozzle, the said nozzle comprising at least one of following two piloting means: a means of dividing the principal flow into each of the two half-nozzles, and a means of orienting the thrust vector produced by each of the two half-nozzles, the said two means being fluidic injection means.

In the present application, the term "half-nozzle" refers to a gas ejection nozzle which receives a portion of the principal flow downstream of the turbine. This term is not associated with a particular shape.

The system of the invention has the advantage of allowing a separate control of the two half thrust vectors in modulus and in orientation.

This system with fluid injection means has the advantage of being simple and of functioning with a small number of fluidic injection devices, ensuring high reliability and low cost.

Firstly, the said half-nozzles are disposed for an orientation of the thrust vector in yaw. The absence of a vertical stabilizer is thus compensated for.

According to one variant, the said half-nozzles are disposed for pitch control or the nozzle can furthermore comprise two pairs of half-nozzles, one for yaw orientation and the other for pitch orientation.

According to another feature, the means of controlling the division of the flows comprises means of injecting fluid in the throat of each of the half-nozzles. More precisely, as the gas generator is a turbojet, the fluid injection means are fed with air that can be taken from the compressor of the generator. This solution is particularly advantageous because it allows a balanced functioning in all of the flight phases. In particular, a nozzle functioning process is provided in which air is continuously taken from the compressor of the generator.

According to another feature the means of orienting the thrust vector of each of the two half-nozzles are constituted by means of injecting fluid in at least one of the divergent walls of each of the two half-nozzles.

Preferably, the divergent walls on either side of each half-nozzle are not of the same length, the fluid injection means are disposed on the long walls of the divergent portions. In this way the deflected shock wave is prevented from touching the opposite wall.

According to another feature, the half-nozzles are arranged to mask at least partially the cross-section of the principal flow. The IRS is reduced in this way.

According to a variant embodiment, the principal flow is generated by two gas generators. In this case, the nozzle preferably comprises only one means of orientation of the thrust vector produced by each of the two half-nozzles.

The invention also relates to a turbomachine or to a drone comprising such a nozzle.

BRIEF DESCRIPTION OF THE DRAWING(S)

Figure 2:
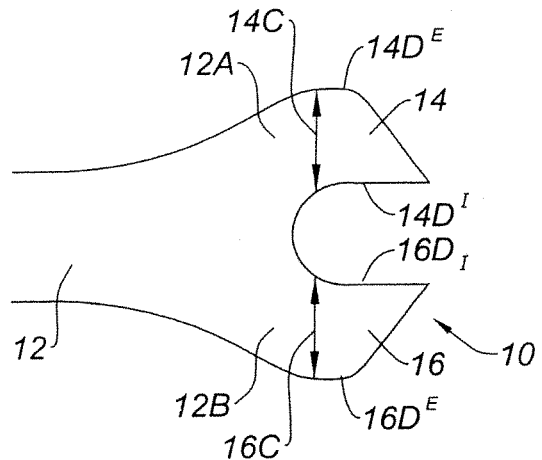
Figure 3:
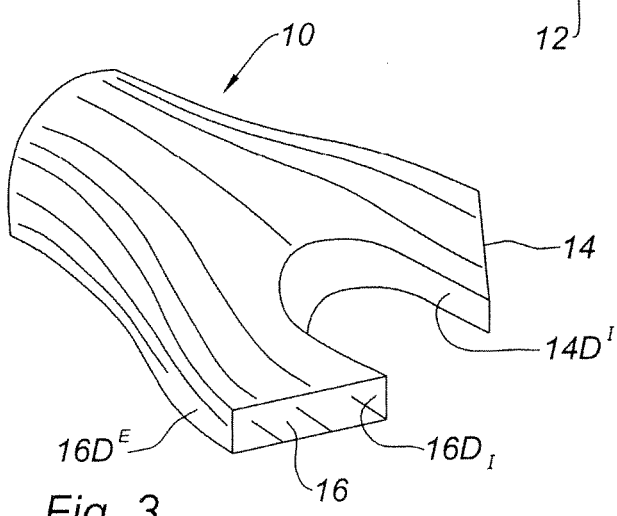
Figure 4:
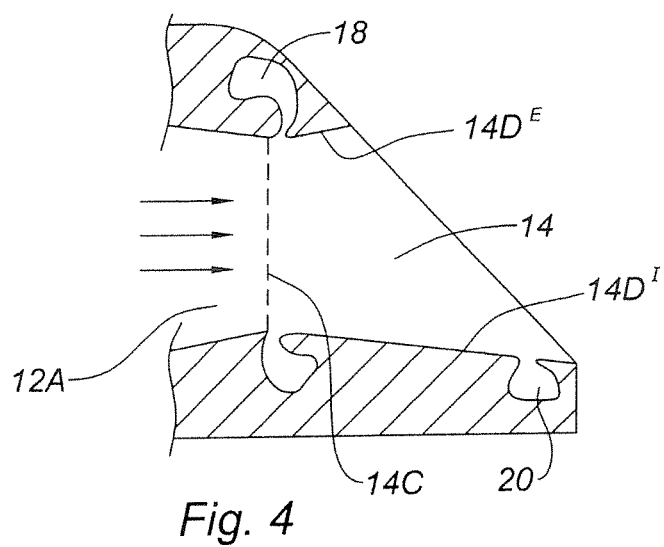
Figure 5:
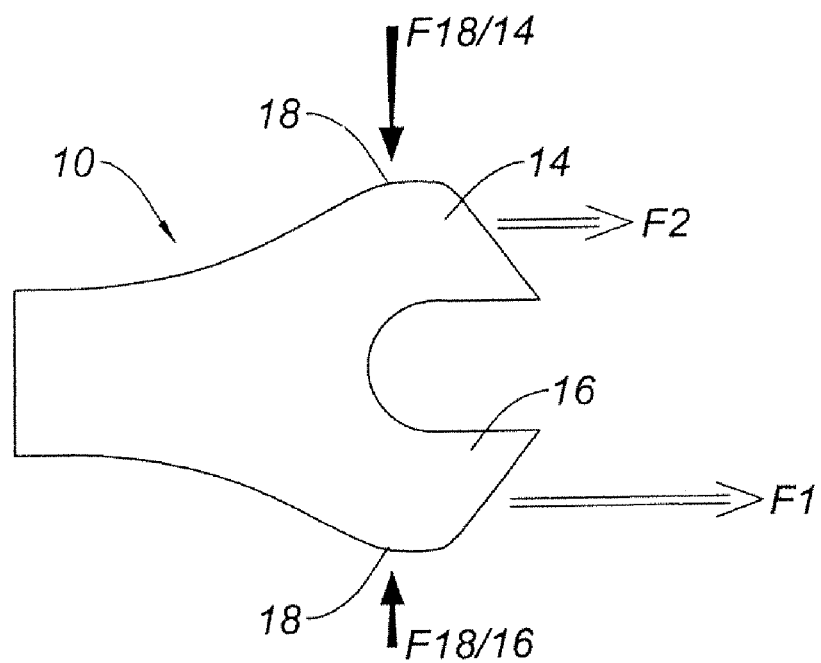
Figure 6:
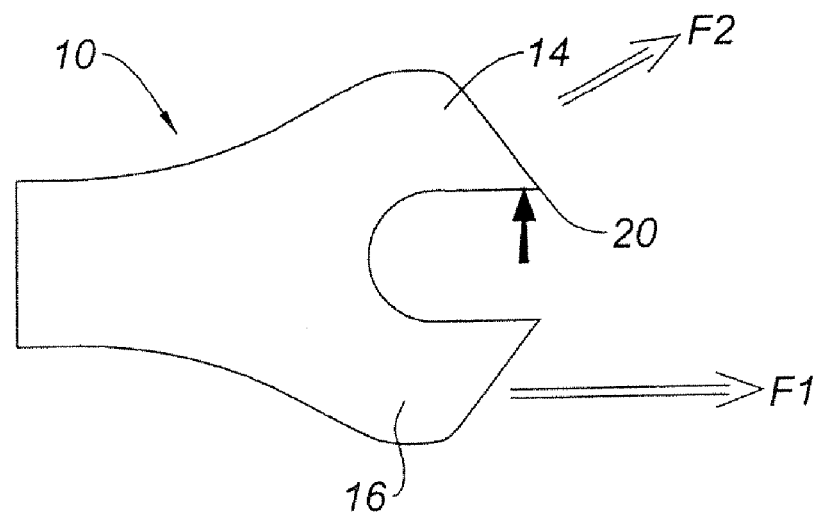

The invention will now be described in more detail with reference to the appended drawings in which:

FIG. 1 is a plan view of a drone equipped with a nozzle according to the invention, FIG. 2 shows the nozzle section only in plan view, FIG. 3 shows the nozzle of FIG. 2 in a ¾ rear view, FIG. 4 is a diagrammatic representation of the arrangement of the control means of the invention in a half-nozzle, FIG. 5 illustrates the functioning of the control means disposed at the throat, FIG. 6 illustrates the functioning of the control means disposed in the divergent portion of the half-nozzles.

DETAILED DESCRIPTION OF THE PREFERRED EMBODIMENTS

The aircraft 1 shown in the figure is a non-limiting example. It has a nose 2, two wings 3 and 4 and is propelled by one or two turbojets that are not visible. It is shaped in such a way that the RCS and IRS are as small as possible. Its rear part in particular comprises no vertical stabilizer and is terminated by a point 5 with an angle at the tip, for example of 40°, which is adapted to deflect radar waves towards infinity. The nozzle 10 of the invention takes part in this constraint by being bifid. It divides the principal flow coming from the channel 12 into two flows, one in each of two symmetrical channels 12A and 12B which end in two half-nozzles 14 and 16 having rectangular cross-sections. The channels 12, 12A and 12B have a shape adapted to ensure the separation of the flow into two flows but also the transition from a cylindrical shape with a circular or substantially circular cross-section to a rectangular cross-section. If necessary, the channels comprise a supplementary bend to ensure the masking of the turbine. As can be seen in the figures, this masking is already provided at least partially by the spacing between the half-nozzles 14 and 16.

Each of the half-nozzles therefore consists of a rectangular throat 14C and 16C respectively, having horizontal elongation with a high width/height ratio as can be seen in FIG. 3. The elongation of the nozzles can be 2.5. Downstream of the throat, the divergent portion is short on the external side $14D^E$ and $16D^E$. The walls of the internal side $14D^I$ and $16D^I$ are longer. This gives a bevelled shape to the downstream end of the nozzles 14 and 16. The upper and lower walls are either parallel with each other or divergent.

The assembly is preferably optimized to provide, in the cases without injection and without vectoring, a minimal transverse thrust of each half-nozzle. In fact, this results in a loss of axial thrust which must be reduced to a minimum. The overall lateral thrust remains zero because of the symmetry of the system.

According to the invention, in order to ensure the guidance of the aircraft 1 without a vertical stabilizer, piloting is provided in which the two flows are acted upon.

FIG. 4 is a diagrammatic view of the half-nozzle 14. This convergent-divergent nozzle comprises the throat 14C and, downstream, the two divergent walls $14D^I$ and $14D^E$. The nozzle in this case comprises a fluid injector 18 disposed on a wall at the level of the throat and a fluid injector 20 situated on the wall $14D^I$ of the divergent portion. The injector is preferably situated close to the end of the divergent portion.

In a symmetrical manner, the half-nozzle is equipped with a fluid injector 18 at the throat 16C and with a fluid injector 20 on the wall of the divergent portion $16D^I$.

The injectors 18 and 20 are advantageously fed with air taken from the turbojet which provides the principal flow.

FIG. 5 shows the functioning of the injectors situated at the throat. In this figure, the injections of air through the injectors 18 have been represented by arrows 18/14 and 18/16. The yaw moment is created by controlling the division of the flow in each of the two half-nozzles 14 and 16 by means of fluid injection at the two throats. According to this example the half-nozzle 14 receives a strong injected flow 18/14 and consequently undergoes a large restriction of the effective cross-section of the throat. Conversely, the half-nozzle 16 receives little or no flow at the throat. This results in the creation of an axial thrust differential F2/F1, right/left in this case, and therefore a yaw moment.

It is observed however that a sudden obstruction of the nozzle would instantaneously create a pressure rise in the channel and a risk of pumping the compressor. According to a preferred operating mode, a permanent nominal injection is created. It is produced with constant flow so that the generator does not undergo a sudden variation during the mission whilst regulating the nozzle to constant effective overall cross-section at the throat. The thermodynamic cycle of the engine is optimized directly under this constant drawing off constraint. In this way, the system for regulating the air drawn off operates continuously and does not have a transient starting phase.

Thus, this operating mode according to the invention provides, with a slight impact on the performance of the engine, a vector thrust which makes it possible to compensate for the absence of a tail unit, in particular for cruising or slow transitory conditions.

The functioning of the injection device situated in the divergent portion of the nozzles 14 and 16 will now be described with reference to FIG. 6.

The injectors are preferably disposed at the end of the long divergent portion wall. Injecting a fluid into the nozzle 14 induces a deflection of the thrust vector produced by the nozzle and represented by the arrow F2. The thrust F1 provided by the half-nozzle 16 remains axial since nothing has disturbed its direction. This results in the creation of a yaw moment with respect to the centre of gravity of the aircraft. This operating mode provides a large vector thrust to ensure the piloting of the aircraft, to the detriment, however, of the performance of the generator. This deterioration is however controlled.

One embodiment of the invention has been described. Many variations are possible however without departing from the scope of the invention. For example, a channel 12 has been shown fed by a single gas generator. In the case of a twin-engine aircraft, the two half exhaust flows are generated by two separate engines whose regulation is synchronized. Preferably, only the injectors in the divergent portion are used.

Variants of the arrangement and functioning of the piloting means comprise the presence of a single piloting means. It is possible to make it operate at the same time as the other means or separately.

According to an embodiment which is not shown, the nozzles can be of the fluidic type with an ejector, that is to say a secondary flow emerging in or downstream of the principal channel.

The piloting means according to the invention can be combined partly with mechanical means of orienting the flows.

The invention claimed is:

1. A thrust orienting nozzle for an aerospace vehicle, comprising:
    a channel configured to guide a principal propulsion gas flow downstream from at least one gas generator;
    a first symmetric channel configured to guide a first portion of the principal propulsion gas flow from the channel to a first half-nozzle;
    a second symmetric channel configured to guide a second portion of the principal propulsion gas flow from the channel to a second half-nozzle;
    the first half-nozzle configured to eject the first portion of the principal propulsion gas flow, the first half-nozzle including a first throat and first divergent walls downstream of the first throat, the first divergent walls including a first internal side and a first external side;
    the second half-nozzle configured to eject the second portion of the principal propulsion gas flow, the second half-nozzle including a second throat and second divergent walls downstream of the second throat, the second divergent walls including a second internal side and a second external side; and
    at least one of the following two piloting means, including
    a) a means of dividing the principal propulsion gas flow into each of the half-nozzles, and
    b) a means of orienting the thrust vector produced by each of the two half-nozzles,
    wherein the at least one of the two piloting means being fluid injection means downstream of the first symmetric channel and the second symmetric channel and within the first half-nozzle and the second half-nozzle.

2. The thrust orienting nozzle according to claim 1, wherein said first half-nozzle and said second half-nozzle are configured to orientate a thrust vector in yaw for the aerospace vehicle.

3. The thrust orienting nozzle according to claim 1, wherein said first half-nozzle and said second half-nozzle are configured to orientate a thrust vector in pitch for the aerospace vehicle.

4. The thrust orienting nozzle according to claim 2, wherein the nozzle comprises two pairs of half-nozzles, including
    a first pair of half-nozzles for the orientation of the thrust vector in yaw, and
    a second pair of half-nozzles for an orientation of a thrust vector in pitch for the aerospace vehicle,
    wherein the first pair of half-nozzles includes the first half-nozzle and the second half-nozzle, and the second pair of half-nozzles includes a third half-nozzle and a fourth half-nozzle.

5. The thrust orienting nozzle according to claim 1, wherein the means of dividing the principal propulsion gas flow comprises the fluid injection means in the throat of each of the half-nozzles.

6. The thrust orienting nozzle according to claim 5, wherein the gas generator is a turbojet, and the fluid injection means are supplied with air drawn off from a compressor of the at least one gas generator,
    wherein the fluid injection means are disposed on the first internal side of the first half-nozzle and the second internal side of the second half-nozzle, the first internal side being longer than the first external side as measured downstream from the first throat, the second internal side being longer than the second external side as measured downstream from the second throat.

7. The thrust orienting nozzle according to claim 6, wherein the air is continuously drawn off from the compressor.

8. The thrust orienting nozzle according to claim 1, wherein the means of orienting a thrust vector produced by the first half-nozzle and a thrust vector produced by the second half-nozzle are constituted by the fluid injection means disposed in at least one of the first divergent walls of and in at least one of the second divergent walls.

9. The thrust orienting nozzle according to claim 8,
    wherein the fluid injection means are disposed on the first internal side of the first half-nozzle and the second internal side of the second half-nozzle, the first internal side being longer than the first external side as measured downstream from the first throat, the second internal side being longer than the second external side as measured downstream from the second throat.

10. The thrust orienting nozzle according to claim 1, wherein the at least one gas generator includes a turbine, and the first half-nozzle and the second half-nozzle are arranged to mask the turbine.

11. The thrust orienting nozzle according to claim 1, wherein the principal propulsion gas flow is generated by two gas generators and the thrust orienting nozzle comprises a means of orientation of a thrust vector produced by each of the half-nozzles.

12. A turbomachine, comprising:
    turbomachinery configured to create a principal propulsion gas flow;
    a channel configured to guide the principal propulsion gas flow downstream from the turbomachinery;

a first symmetric channel configured to guide a first portion of the principal propulsion gas flow from the channel to a first half-nozzle;

a second symmetric channel configured to guide a second portion of the principal propulsion gas flow from the channel to a second half-nozzle;

the first half-nozzle configured to eject the first portion of the principal propulsion gas flow, the first half-nozzle including a first throat and first divergent walls, the first divergent walls including a first internal side and a first external side;

the second half-nozzle configured to eject the second portion of the principal propulsion gas flow, the second half-nozzle including a second throat and second divergent walls, the second divergent walls including a second internal side and a second external side; and at least one of the following two piloting means, including a) a means of dividing the principal propulsion gas flow into each of the half-nozzles, and b) a means of orienting the thrust vector produced by each of the two half-nozzles, wherein the at least one of the two piloting means being fluid injection means, and two half-nozzles includes the first half-nozzle and the second half-nozzle, and wherein the fluid injection means are disposed on the first internal side of the first half-nozzle and the second internal side of the second half-nozzle, the first internal side being longer than the first external side as measured downstream from the first throat, the second internal side being longer than the second external side as measured downstream from the second throat.

13. The thrust orienting nozzle according to claim 1, wherein the aerospace vehicle is a drone, the first internal side being longer than the first external side as measured downstream from the first throat, and the second internal side being longer than the second external side as measured downstream from the second throat.

14. The thrust orienting nozzle according to claim 1, wherein the first divergent walls also includes an upper wall and a lower wall, and the upper wall and the lower wall are opposite to each other and parallel to each other.

* * * * *